May 4, 1948.    G. A. LYON    2,440,805
PLASTIC TIRE COVER
Filed July 5, 1944    2 Sheets-Sheet 1
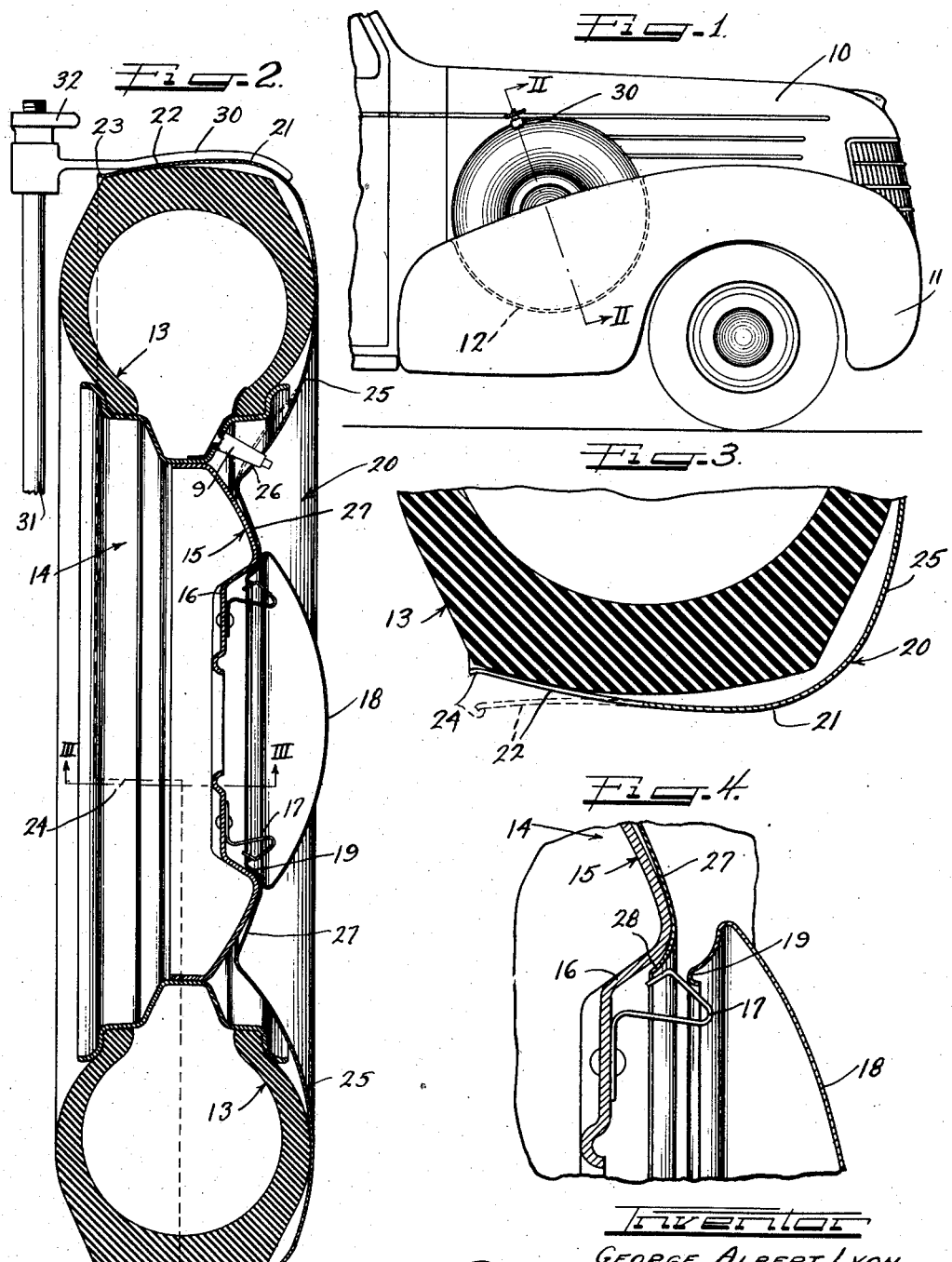

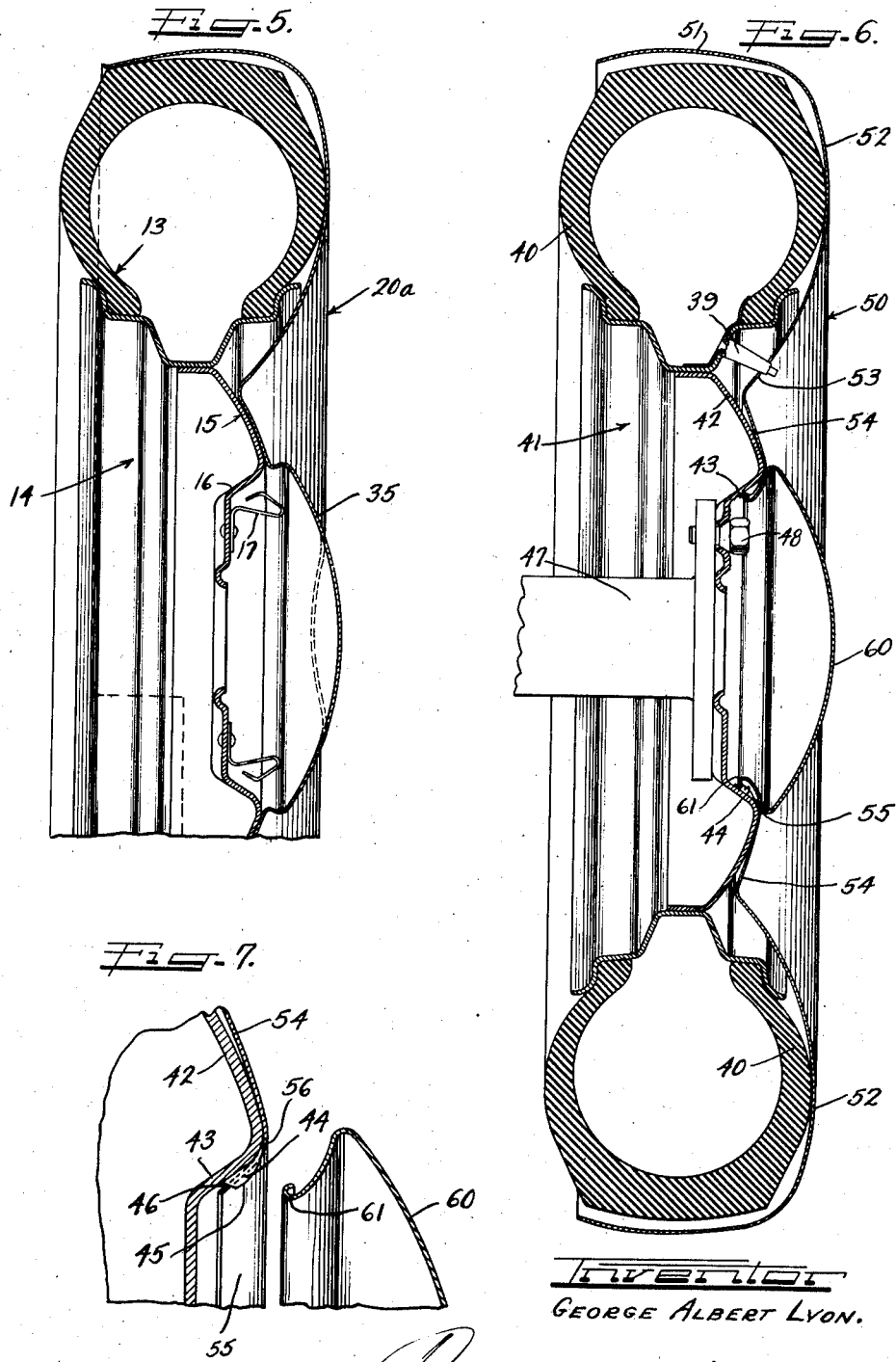

Patented May 4, 1948

2,440,805

UNITED STATES PATENT OFFICE 2,440,805

PLASTIC TIRE COVER

George Albert Lyon, Allenhurst, N. J., assignor to Lyon, Incorporated, Detroit, Mich., a corporation of Delaware Application July 5, 1944, Serial No. 543,524

4 Claims. (Cl. 150—54)

This invention relates to tire covers, and more particularly, to a flexible tire cover made of plastic material which is self-sustaining as to form and yet resiliently deflectable in the use of the cover.

An object of this invention is to provide a tire cover made of a plastic material which is self-sustaining as to form and yet manually and resiliently deflectable in use.

Another object of this invention is to provide a plastic tire cover which may be used to cover either the so-called side mounted spare tire usually disposed in a fender well or to cover a rear mounted spare tire supported on the back of an automobile.

In accordance with the general features of this invention, there is provided a one-piece shell-like cover made of a form sustaining plastic material and which cover includes rear portions which are manually and resiliently deflectable in the application of the cover to or the removal from a spare tire.

Another feature of this invention relates to the provision of a spare tire cover, having a portion apertured to register with a valve stem on the spare tire and which portion is adapted to be manually depressed when it is desired to have access to the valve stem for the purpose of introducing air into the tire, all without necessitating the removal of the cover from the tire.

Still another feature of the invention relates to the provision of a spare tire cover having a central portion which is adapted to align itself with the center or body part of the wheel and which can be deflected by the skirt of a hub cap inserted in the center part of the wheel to shape and retain the central portion of the cover on the wheel body.

Still another feature of the invention relates to the provision of a one-piece plastic tire cover which has a central hub cap simulating portion and which upon being accidentally dented, will spring back to its original contour by reason of the inherent resiliency of the material.

Another and still further feature of the invention relates to the provision of a plastic tire cover, having a central depressed portion for telescoping cooperation with the hub cap receiving portion of a wheel and which central portion is apertured to permit the hub cap retaining bumps on the wheel to project through the apertures, and thus assist in centering and retaining the cover in place on the spare wheel.

Other objects and features of this invention will be more fully apparent from the following detailed description taken in connection with the accompanying drawings, which illustrate several embodiments thereof, and in which Figure 1 is a fragmentary side view of a front part of an automobile, illustrating my tire cover applied to a spare tire in a fender well;

Figure 2 is an enlarged cross-sectional view with parts broken away taken on substantially the line II—II of Figure 1, looking in the direction indicated by the arrows and showing the cross-sectional contour of the tire cover embracing the spare tire that is supported in the well;

Figure 3 is an enlarged fragmentary cross-sectional view taken on substantially the line III—III of Figure 2, looking upwardly and illustrating in dotted lines how the rearmost marginal portion of the cover may be manually flexed in its application to and removal from the spare tire;

Figure 4 is an enlarged fragmentary cross-sectional view corresponding to the central part of Figure 2, but showing the hub cap removed from the cover in a position where it is about to be pressed into retaining cooperation with the cover and the hub cap retaining springs on the spare wheel;

Figure 5 is a fragmentary cross-sectional view similar to Figure 2, illustrating a modification of the invention wherein the central part of the cover is formed into a hub cap simulating part, thus dispensing with the necessity for the use of a hub cap in the spare wheel assembly;

Figure 6 is a cross-sectional view with the central support broken away of a modified form of a spare tire cover wherein the retention of the cover is accomplished solely through the use of a central hub cap arrangement; and Figure 7 is a fragmentary cross-sectional view corresponding to the central part of Figure 6, but showing the hub cap in a removable position just prior to its being pressed axially into retained cooperation with the hub cap retaining protuberances on the wheel.

As shown on the drawings:

The reference character 10 designates generally the forward part of an automobile which may be of any suitable or conventional construction. One or more of the front fenders 11 of this vehicle is provided with a conventional fender well designated generally by the reference character 12, and in which a spare tire is adapted to be accommodated in a manner now well known in the automotive art. Originally it has been the practice to cover and protect such spare tires by means of metal or fabric tire covers. It is the aim of this invention to supplant such previous type of tire cover by a plastic cover, which has the advantages of both metal and fabric covers, but which is lighter in weight than the metal cover and differs from the fabric cover in that it has the form-sustaining characteristics of the metal cover.

Positioned in the well in the usual way, is a spare tire and wheel assembly, the tire being designated by the reference characters 13, and the spare wheel being designated by the reference character 14. The spare wheel has the usual central body part 15, which is depressed or recessed at 16 to receive a hub cap such as are used on modern wheels. This central depressed section 16 has attached to it the usual so-called inverted type of hub cap retaining springs 17, which may be of any suitable number, such for example, as three or more. This spare tire and wheel structure is now conventional and well known in the art.

The hub cap for cooperation with the springs 17 is designated generally by the reference character 18, and is the same hub cap that is used on the wheel when the wheel is employed as a running wheel on the vehicle. This hub cap has a skirt 19 adapted to be pressed over and into retained engagement with the spring clips 17 inside of the recessed central portion 16 of the wheel body 15.

In the form of the invention illustrated on the first sheet of the drawings, the spare tire cover of my invention is designated generally by the reference character 20. It is made of a plastic material, which has the inherent quality of being self-sustaining as to shape and yet can be manually and resiliently deflected without permanent deformation. In other words, upon slight deflection of the same, the portion that is deflected will upon release spring back to its original contour. If such deflected portion is held under a stressed or deflected state, it will normally tend to spring back to its original contour and it is this character which I utilize in my cover to assist in the retention of the cover on the spare tire.

Excellent results may be obtained by making the spare tire cover of a synthetic material, such for example, as ethyl cellulose, known to the trade as "Ethylcel." Other commercial forms of plastic material also lend themselves to this usage, for example, plastic such as the one known to the trade by the name "Tenite" may be employed. These materials I have found to be resistant to weather and to the different climatic conditions encountered in the normal use of an automobile.

The spare tire cover 20 includes an annular tread covering portion 21 terminating in a discontinuous rear marginal portion 22, having a slightly turned rear edge 23. The continuous portion 21 of the tire cover may transversely extend to at least the medial plane of the tire. The discontinuous portion 22 of the cover extends rearwardly beyond the medial plane of the tire and has its lower edges 24 (Fig. 2) terminating slightly below the center of the wheel, so that these portions 24 hug the tire and assist in retaining the cover on the tire. That is to say, the discontinuous portion 22 extends around substantially more than one-half of the circumference of the tire so that its end portions 24 must be manually deflected before the cover can be mounted on the tire, as I shall describe more fully hereinafter.

The tire cover 20 also includes an annular outer side portion 25, having a convex-concave cross section which symmetrically covers the outer side wall of the tire, and the side flanges of the rim of the wheel. This side wall portion 25, as shown in Figure 2, is curved from the tread of the tire around the bulging side wall of the tire and radially inwardly to a point over the wheel body 15 where it is joined with a radially inwardly extending portion 27, disposed on the face of the wheel body.

The portion 25 is apertured at 26 to allow the outermost extremity of the valve stem to project slightly therethrough. However, in order to have access to the valve stem for the purpose of introducing air therein, more of the valve stem must be exposed. To accomplish this, the part of the cover portion 25 around the opening 26 may be manually depressed to the dotted line position shown in Figure 2. The advantage of this construction is that the valve stem is substantially concealed except for its outermost extremity; and thereby the appearance of the spare cover is not materially detracted from by the unsightly valve stem. This is a feature that may be used to an advantage in all the modifications of my invention that are hereinafter described.

The central portion 27 of the cover terminates in an inclined rearwardly turned margin 28, shown in Figure 4. This margin is adapted to extend around the central nose of the wheel body 15 and into the depressed central wheel body portion 16 behind the extremities of the hub cap retaining clips 17. The advantage of this arrangement is that in mounting the cover on the wheel, its central inner margin 28 can cooperate with the recessed body 16 in centering the cover in a position for the application of the hub cap 18 to the center thereof.

In applying this cover to the wheel, the wheel is, of course, first removed from the fender well 12 and laid on the ground. Then the shell-like cover is placed on top of the tire and wheel with the opening 26 aligned with the valve stem 9. Thereafter the operator grasps the rear extremities 24 of the discontinuous portion 22 and flexes the same, while at the same time pushing the cover axially over the tread of the tire. In so doing the inner margin 28 of the cover is brought into register with the depressed section 16 of the wheel, thus centering the cover in its support centrally of the spare wheel assembly. After the cover has been pressed completely home so that its portion 25 is against the tire, and its portion 27 is against the wheel body 15, the operator releases the deflected extremities 24, which immediately spring back toward their original positions and into gripping engagement with the tread to the rear of the medial plane of the tire. I have illustrated in Figure 3 the manner in which the identical opposite extremities or corners 24 of the discontinuous cover portion 22 are adapted to be manually deflected.

Thereafter the hub cap 18 is aligned with the center of the wheel as shown in Figure 4, and is pressed axially home into retained cooperation with the spring clips 17. In the course of this action, the central marginal portion 28 of the cover conforms to and is tightly clamped against the curved nose portion about the central depressed wheel portion 16. This results in the cover being tightly clamped at its center to the wheel body in addition to its being retainingly held on the wheel at the outer periphery of the tire by the discontinuous flexible rear portion 22 of the cover.

The covered wheel is then put in the well 12, and the assembly may be held in the well by any suitable well-known clamping means, such for example, as clamping arm 30 on the top of the post 31 carried by the vehicle to the rear of the fender well. This type of clamp structure is also well known in the art. A suitable locking nut 32 may be provided on the upper end of the post 31 to press the clamp arm 30 downwardly and tightly against the top of the cover so as to hold the assembly in the well and against movement upwardly.

The use of plastic material in the cover is distinctly advantageous over the metal cover in that it eliminates metal contact with the wheel and well and thereby reduces to a minimum the likelihood of rattle. In addition, plastic material lends itself admirably to any suitable finish or ornamentation. For illustration, portion 25 could be colored to simulate a white side wall tire, and portion 26 could be finished to correspond with the color on the wheel body. If so desired, any portion of the cover could be made transparent. For illustration, if the portion 27 is made transparent then the color of the wheel body part 15 would be visible therethrough, and thus cause the assembly to blend in with the running wheels of the vehicle.

In addition, the resiliently flexible margin 28 of the cover affords a cushioned seat for the hub cap 13 which likewise tends to reduce to a minimum rattle. Another advantage of the plastic cover of my invention is that by reason of its being very light in weight as distinguished from the metal cover, the hub cap can be used satisfactorily to clamp the central portion of the cover to the wheel body.

In Figure 5 I have illustrated a modification of the invention in which the cover is designated generally by the reference character 20a. This plastic cover 20a cooperates with exactly the same spare wheel assembly as is shown in Figure 2, and hence the parts of the assembly that are common to these forms have been designated by the same reference characters. The principal difference between the spare tire cover 20a and the cover 20 resides in the fact that the form shown in Figure 5 has integrally formed with it at its center a hub cap simulating portion 35 which covers the central recessed portion 16, and the spring clips 17 of the wheel. This integral portion 35 of the cover takes the place of the separate hub cap 18.

As shown by the dotted line in Figure 5, should any portion of the cover, such, for example, as the central portion 35, be accidentally dented, the dented portion will inherently spring back to its original contour due to the inherent resiliency of the plastic material. This is advantageous since it is not uncommon in the operation of a vehicle for the tire cover to come into contact accidentally with an obstruction and when this occurs the unsightly ensuing dent does not remain in the cover as is so frequently the case in metal tire covers.

In the form of the invention shown in Figure 5, it will be perceived that the cover is supported by the tire and hence this form of the invention lends itself to use in covering the spare tire even though no spare wheel may be disposed in the center of the assembly. For illustration, if the wheel is mounted only on a tire rim and the wheel is detached therefrom, in a manner well known to those in the art, the cover will still support itself since it depends on the tire for its retention in the spare tire assembly.

In Figures 6 and 7, I have illustrated a third modification of my invention wherein the plastic tire cover is supported solely at the center of the spare wheel assembly by means of a clamping hub cap. In this form of the invention, the spare tire is designated generally by the reference character 40, and is carried on a conventional wheel 41, having a wheel body 42, which terminates at its center in a central depressed hub cap retaining portion 43. This portion 43 is best shown in Figure 7 and is provided with a plurality of spaced protuberances 44, which are arranged in a common circle. Each of these protuberances has a cam or inclined surface 45 terminating at its rear in a shoulder 46. The protuberances may be integral with the wheel body or may be welded or soldered on the wheel body as desired.

In this form of the invention, the spare wheel assembly may be supported either in the fender well or at the rear of an automobile. The wheel of the assembly may be secured to a certain flanged support 47 by means of suitable cap screws or bolts 48 extending through the usual bolt openings in the depressed central portion 43 of the wheel body.

The tire cover of this form of the invention is designated generally by the reference character 50 and is of a shell-like configuration. It is made of a plastic material like that described in connection with the previous forms of the invention, and includes a continuous outer tread covering portion 51 and a convexly curved outer side wall cover portion 52 which portion extends clear down to the body part 42 over the usual valve stem 39 of the spare tire. The continuous annular portion 51, as shown, may be of a diameter slightly in excess of that of the tire tread so that it in itself does not necessarily have to be sprung in the application of the cover to the tire and still not interfere with the springing of the radial portions 52, 53 and 54 of the cover as it is pressed axially home against the tire. The portion 52 is provided with an opening 53 adapted to be aligned with the valve stem in the same manner as was described in connection with Figure 2. The same advantages ensue from this structure as are present in the previous forms of the invention.

The portion 52 terminates in a radially inwardly extending annular band 54 arranged to overlie the wheel body part 42 and band 54 in turn is formed into a curved inner margin 55 arranged to telescope the depressed portion 43 of the wheel body. This curved margin 55 is provided with a plurality of apertures 56 (Fig. 7) corresponding in number and in spacing to that of the protuberances 44 so that the protuberances can extend through the apertures 56 when the cover is on the wheel. In this form of the invention by reason of the fact that the cover is supported solely from the center part of the wheel, it is clear that the tire need not be on the wheel in order for the cover to be used therewith.

In applying this form of cover to the wheel, the cover is first aligned with the tire and wheel with the opening 53 in register with the valve stem 39. Thereafter the cover is pressed axially onto the wheel the protuberances 44 extend through the openings 56 in the cover at which time the central portion of the cover will be backed up by the body part of the wheel. Thereafter the hub cap 60 is disposed in the position shown in Figure 7 and is pressed axially onto the recessed portion 43 of the wheel body until its continuous rear springy edge 61 is snapped over and into retaining engagement with the shoulders 46 of the protuberances. In this application of the hub cap to the wheel, the springy edge 61 is cammed along the inclined surface 45 of the protuberances until it snaps behind the shoulders 46. In so applying the cover to the wheel, it deflects and in turn clamps the central margin 55 of the plastic tire cover against the wheel body, thus shaping and holding the central margin 55 on the wheel. The material of the cover of course affords a cushioned seat for the hub cap and by reason of its thinness can be easily retained against the wheel with less likelihood of the hub cap springing off the wheel. This is not true of a cover made of metal.

In all forms of the invention, by reason of the fact that the material of the cover is resiliently deflectable any slight manufacturing differences in the relative location of the outer portion of the wheel body and the side of the tire may be adjusted. That is to say, the cover can, in either its outer side portion or its central portion, adjust itself to the contour of the sides of the tire and wheel. This enables a snug fit irrespective of the condition of inflation of the tire.

All forms of the invention also lend themselves to different color contrasts. For illustration, if the color of any of the parts of the spare wheel and tire embraced by the cover is to be utilized, corresponding covering portions of the cover may be made transparent so as to enable the desired color to be visible.

I claim as my invention:

1. A spare tire cover and wheel assembly including a tire and a central wheel body having a recessed portion for retaining cooperation with a hub cap, a shell-like spare tire cover made of a thermoplastic material which is substantially form sustaining and yet resiliently deflectable without permanent distortion, said cover having a discontinuous tire tread covering portion having areas extending beyond the diameter of the wheel from the main area of the discontinuous portion and which are manually deflectable as the cover is pressed over and onto the tire and when released snapping back for cooperating in the retention of the cover on the tire.

2. A spare tire cover and wheel assembly including a tire and a central wheel body having a recessed portion for retaining cooperation with a hub cap, a shell-like spare tire cover made of a thermoplastic material which is substantially form sustaining and yet resiliently deflectable without permanent distortion, said cover having a discontinuous tire tread covering portion having corner areas extending beyond a diameter of the wheel from the main area of the discontinuous portion and which are manually deflectable as the cover is pressed over and onto the tire and when released snapping back for cooperating in the retention of the cover on the tire, said cover also having a central margin for telescoping the center of the wheel body and arranged to be resiliently shaped and clamped to the wheel by the insertion of a hub cap in the center of the wheel.

3. A plastic spare tire cover formed from thin sheet-like material on the order of ethyl cellulose and characterized in that it is adapted for substantial resilient deflection normal to the plane at any selected area thereof and snaps back to original predetermined shape when released from deflecting force or pressure, said tire cover comprising a shell-like structure including an annular outer portion generally conformable in concealing covering relation to a tire supported upon a spare wheel, and a central portion concealingly engageable with at least a portion of the wheel, said annular outer portion extending continuously annularly to at least the medial plane of the tire and having a section thereof extending rearwardly beyond the medial plane of the tire and being annularly discontinuous but extending at its opposite ends beyond half the circumference of the tire from the main area of said section, the ends of said section affording corner areas normally adapted for gripping engagement with the tire for retention of the cover on the tire and being manually deflectable in the application of the cover to a tire for avoiding interference with such application, said corner areas being adapted to snap back into tire-gripping relation when released from the manual deflection.

4. A plastic spare tire cover formed from thin sheet-like material on the order of ethyl cellulose and characterized in that it is adapted for substantial resilient deflection normal to the plane at any selected area thereof and snaps back to original predetermined shape when released from deflecting force or pressure, said tire cover comprising a shell-like structure including an annular outer portion generally conformable in concealing, covering relation to a tire supported upon a spare wheel, and a central portion concealingly engageable with at least a portion of the wheel, said annular outer portion extending continuously annularly to at least the medial plane of the tire and having a section thereof extending rearwardly beyond the medial plane of the tire and being annularly discontinuous but extending at its opposite ends beyond half the circumference of the tire from the main area of said section, the ends of said section affording corner areas normally adapted for gripping engagement with the tire for retention of the cover on the tire and being manually deflectable in the application of the cover to a tire for avoiding interference with such application, said corner areas being adapted to snap back into tire-gripping relation when released from the manual deflection, the central portion of the cover being generally conformable to that portion of the wheel engaged by a hub cap and adapted to be clamped in position on the wheel by a hub cap.

GEORGE ALBERT LYON.

REFERENCES CITED

The following references are of record in the file of this patent:

UNITED STATES PATENTS

| Number | Name | Date |
|---|---|---|
| Re. 20,484 | Lyon | Aug. 24, 1937 |
| 1,986,834 | Lyon | Jan. 8, 1935 |
| 2,021,892 | Lyon | Nov. 26, 1935 |
| 2,089,952 | Fergueson | Aug. 17, 1937 |
| 2,092,976 | Jandus | Sept. 14, 1937 |
| 2,107,015 | Short | Feb. 1, 1938 |
| 1,234,387 | Pugh et al. | July 24, 1917 |
| 2,368,254 | Lyon | Jan. 30, 1945 |